(12) United States Patent
Ware (10) Patent No.: US 8,402,838 B1
(45) Date of Patent: Mar. 26, 2013

(54) NUTPLATE TESTER

(75) Inventor: Jeff L. Ware, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 257 days.

(21) Appl. No.: 12/984,560

(22) Filed: Jan. 4, 2011

(51) Int. Cl.
*G01N 3/00* (2006.01)

(52) U.S. Cl. ............................................. 73/798

(58) Field of Classification Search ............... 73/798
See application file for complete search history.

(56) References Cited

U.S. PATENT DOCUMENTS

| | | | |
|---|---|---|---|
| 4,736,519 A | | 4/1988 | Roberts |
| 5,013,391 A | * | 5/1991 | Hutter et al. .................. 156/578 |
| 5,704,747 A | * | 1/1998 | Hutter et al. .................... 411/70 |
| 6,200,075 B1 | * | 3/2001 | Gaskin et al. ................... 408/67 |
| 7,114,900 B2 | | 10/2006 | Toosky |
| 7,237,314 B2 | | 7/2007 | Toosky |
| 7,389,698 B2 | | 6/2008 | Hutter, III |
| 7,698,798 B2 | | 4/2010 | Toosky |
| 2004/0139590 A1 | | 7/2004 | Eldessouky |
| 2007/0224016 A1 | | 9/2007 | Toosky et al. |

FOREIGN PATENT DOCUMENTS

WO  WO 2010/009442  1/2010

OTHER PUBLICATIONS

"Tool, Tester, Nutplate Pushoff Strength—RFQ", The Flight Shop Inc., Jan. 6, 2009, retrieved from <http://www.theflightshop.com/Cataspx415.html>.

* cited by examiner

*Primary Examiner* — Lisa Caputo
*Assistant Examiner* — Octavia Davis-Hollington
(74) *Attorney, Agent, or Firm* — McDermott Will & Emery LLP (57) ABSTRACT

A nutplate tester is provided. The nutplate tester includes a main body and a holder coupled to the main body. The holder is configured to hold a probe. The nutplate tester also includes a pneumatic actuator coupled to the holder, and an extension frame coupled to the main body. The extension frame includes an attachment portion configured to attach to a post foot that engages a structure that a nutplate is fastened to. The pneumatic actuator is configured to apply pressure against the holder relative to the extension frame to engage the nutplate by the probe held by the holder. The nutplate tester also includes a feed control coupled to the pneumatic actuator. The feed control is configured to control fluid to be supplied to the pneumatic actuator to apply the pressure by the pneumatic actuator against the holder according to at least one of a controlled speed and a controlled pressure.

20 Claims, 10 Drawing Sheets

NUTPLATE TESTER

STATEMENT AS TO RIGHTS TO INVENTIONS MADE UNDER FEDERALLY SPONSORED RESEARCH OR DEVELOPMENT

This invention was made with Government support under Contract Number N00019-02-C-3002 awarded by The Department of the Navy. The Government has certain rights in this invention.

FIELD

The present invention generally relates to manufacturing equipment and, in particular, relates to nutplate testers.

BACKGROUND

Nutplates are typically designed for blind mounted applications where it is impractical to use hex nuts or where it is desirable to have an attached nut for ease of maintenance. To test whether a nutplate is sufficiently fastened to a structure, the nutplate may be subjected to a force for a certain duration. However, existing approaches for testing nutplates typically involve using tools that are bully, not ergonomic, and/or require operators to hold the tools in awkward positions, which makes testing the nutplates difficult especially when the operators need to apply force to the tools to test the nutplates.

SUMMARY

According to various aspects of the subject technology, nutplate testers that allow operators to test nutplates with ease are provided. In some aspects, a nutplate tester may hold and secure a probe such that the probe engages and tests a nutplate in an effective manner without having to rely on an operator to supply the force needed to test the nutplate. In some aspects, the probe may be an existing compression nutplate tester. In some aspects, the nutplate tester may use a pneumatic actuator to apply the force needed to test the nutplate.

According to various aspects of the subject technology, a nutplate tester is provided. The nutplate tester comprises a main body and a holder coupled to the main body. The holder is configured to hold a probe. The nutplate tester also comprises a pneumatic actuator coupled to the holder, and an extension frame coupled to the main body. The extension frame includes an attachment portion configured to attach to a post foot that engages a structure that a nutplate is fastened to. The pneumatic actuator is configured to apply pressure against the holder relative to the extension frame to engage the nutplate by the probe held by the holder. The nutplate tester also comprises a feed control coupled to the pneumatic actuator. The feed control is configured to control fluid to be supplied to the pneumatic actuator to apply the pressure by the pneumatic actuator against the holder according to at least one of a controlled speed and a controlled pressure.

According to various aspects of the subject technology, a method for testing a nutplate is provided. The method comprises: attaching a post foot to an attachment portion of an extension frame; engaging, with the post foot, a structure that a nutplate is fastened to; applying pressure, with a pneumatic actuator, against a holder relative to the extension frame to engage the nutplate by a probe held by the holder; and controlling, with a feed control, fluid to be supplied to the pneumatic actuator to apply the pressure by the pneumatic actuator against the holder according to at least one of a controlled speed and a controlled pressure.

According to various aspects of the subject technology, a nutplate tester is provided. The nutplate tester comprises a main body and a holder coupled to the main body. The holder is configured to hold a probe. The nutplate tester also comprises a pneumatic actuator coupled to the holder, and an extension frame coupled to the main body. The nutplate tester also comprises a post foot attached to an attachment portion of the extension frame. The post foot is configured to engage a structure that a nutplate is fastened to. The pneumatic actuator is configured to apply pressure against the holder relative to the extension frame to engage the nutplate by the probe held by the holder. The nutplate tester also comprises a feed control coupled to the pneumatic actuator. The feed control is configured to control fluid to be supplied to the pneumatic actuator to apply the pressure by the pneumatic actuator against the holder according to at least one of a controlled speed and a controlled pressure. The nutplate tester also comprises a timer assembly coupled to the pneumatic actuator. The timer assembly is configured to control fluid to be supplied to the pneumatic actuator to apply the pressure by the pneumatic actuator against the holder for a controlled duration.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
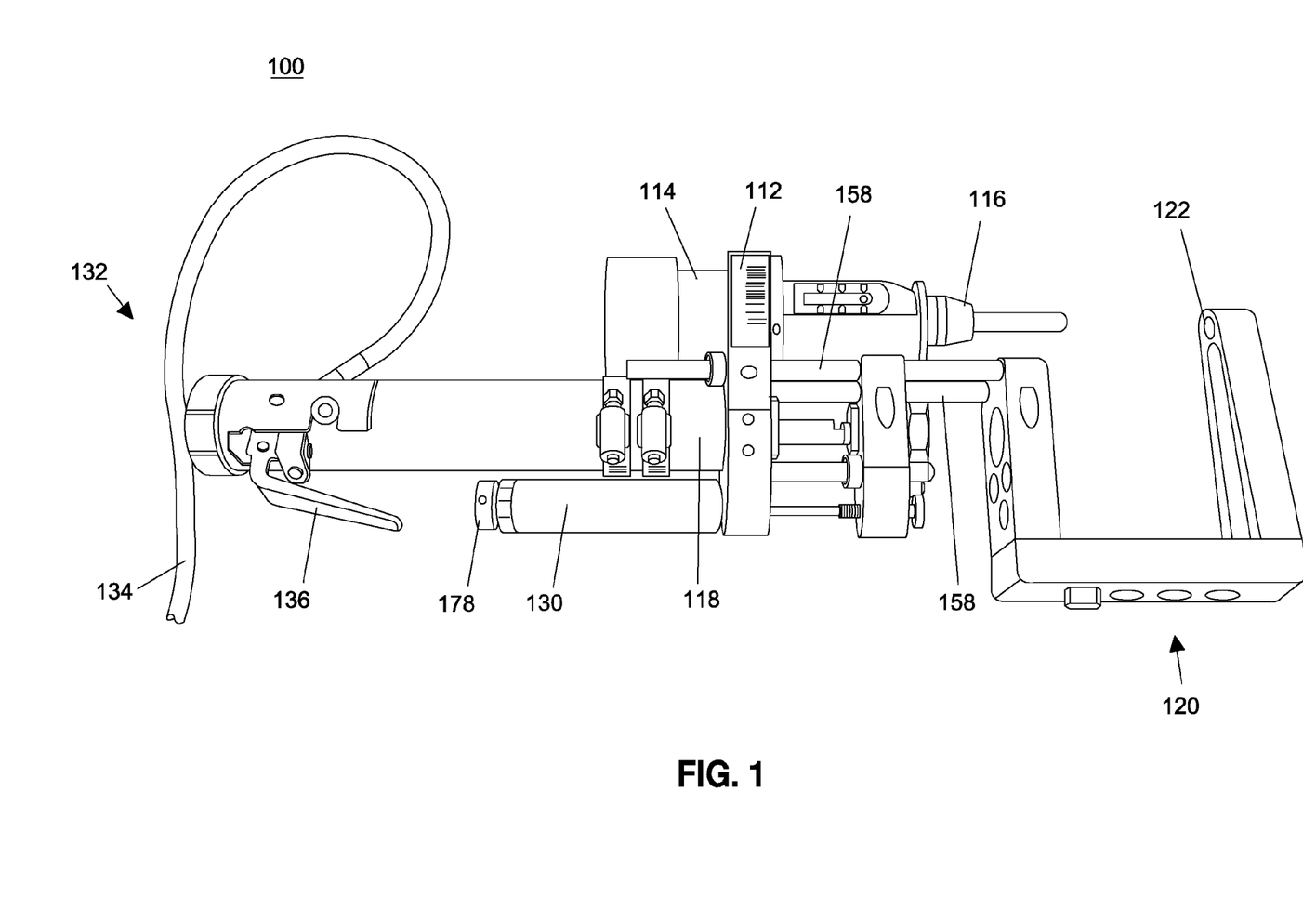
FIG. 1 illustrates a side view of a nutplate tester, in accordance with various aspects of the subject technology.

FIG. 1 illustrates a side view of nutplate tester 100, in accordance with various aspects of the subject technology. Nutplate tester 100 comprises main body 112, holder 114 coupled to main body 112, pneumatic actuator 118 coupled to holder 114, extension frame 120 coupled to main body 112, feed control 130 coupled to pneumatic actuator 118, and fluid intake assembly 132. Holder 114 is configured to hold probe 116, which is used to engage and test a nutplate (not shown) coupled to attachment portion 122 of extension frame 120. Pneumatic actuator 118, for example, may be an air activated cylinder that provides force to move holder 114 toward attachment portion 122 to engage and test the nutplate by probe 116.

In some aspects, a nutplate may be tested by pressing probe 116 against the nutplate and for a certain duration. For example, a particular nutplate fastened to a particular structure may be tested by pressing probe 116 against the nutplate with a force of about 80 pounds (lbs) for a duration of three seconds. If the nutplate becomes unfastened from the structure as a result of this test, the nutplate may be considered insufficiently fastened to the structure. On the other hand, if the nutplate remains fastened to the structure even after the test, then the nutplate may be considered sufficiently fastened to the structure. Although the force applied in the foregoing test is about 80 lbs and the duration of time is three seconds, other suitable values for the force and/or the duration of time may be used for testing a nutplate depending on the size of the nutplate, the size of probe 116, the manner in which the nutplate is fastened to a structure, etc.

In some aspects, probe 116 is an existing compression nutplate tester, such as Click Bond Inc.'s CB602, as illustrated in FIG. 1. Thus, nutplate tester 100 may act as a holder of an existing compression nutplate tester. By acting as a holder of an existing compression nutplate tester, nutplate tester 100 may be used by an operator to test a nutplate more effectively and with more ease than testing the nutplate with just the compression nutplate tester by itself. For example, to operate the CB602 by itself, an operator needs to compress the CB602 against a nutplate by hand at a certain force (e.g., at 80 lbs) and hold the CB602 for a certain duration (e.g., three seconds). This method of testing a nutplate may be difficult for the operator, especially if the nutplate is located in a position in which the operator needs to extend the CB602 in various outreached positions and the operator cannot fully exert the force needed to test the nutplate.

According to various aspects of the subject technology, nutplate tester 100 may hold the CB602 and use pneumatic actuator 118 to apply the force needed to move holder 114 toward attachment portion 122 to engage and test a nutplate by the CB602. Thus, an operator using nutplate tester 100 does not need to exert the force needed to test the nutplate, but may rely on nutplate tester 100 to exert this force. In some aspects, nutplate tester 100 is configured such that nutplate tester 100 is easy to grip compared to gripping the CB602 by itself. For example, nutplate tester 100 may comprise one or more handles to allow the operator to grip nutplate tester 100 while the CB602 is used to test the nutplate.

Although FIG. 1 illustrates probe 116 as being the CB602, probe 116 may be other suitable structures for testing a nutplate. For example, probe 116 may be a rod or another elongate member having a suitable shape to engage a nutplate. In some aspects, probe 116 may be made of steel or other suitable material sufficiently strong to engage and test a nutplate. Probe 116 may be interchanged with probes of other suitable diameters depending on the size of the nutplate being tested.

Figure 2A:
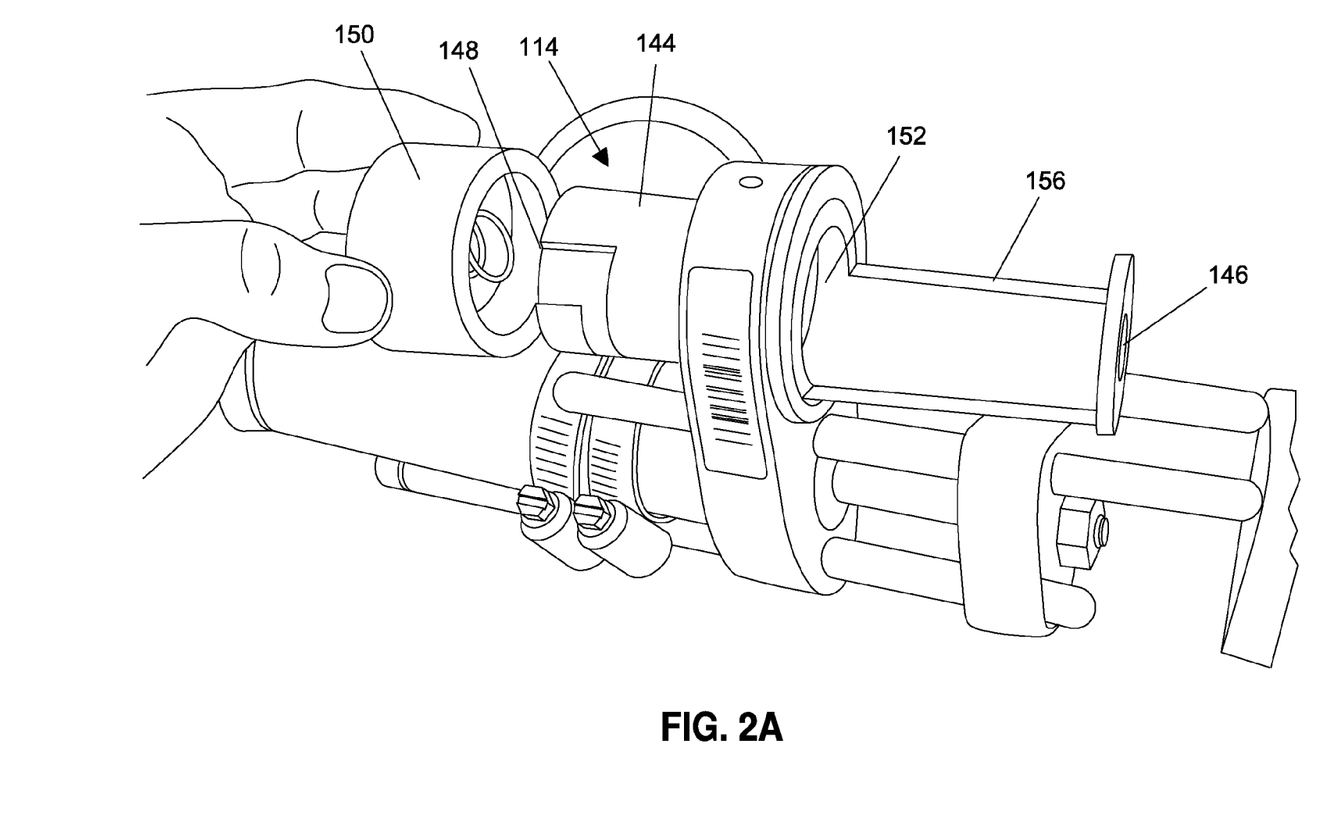
FIG. 2A illustrates a perspective view of a holder, in accordance with various aspects of the subject technology.
Figure 2B:
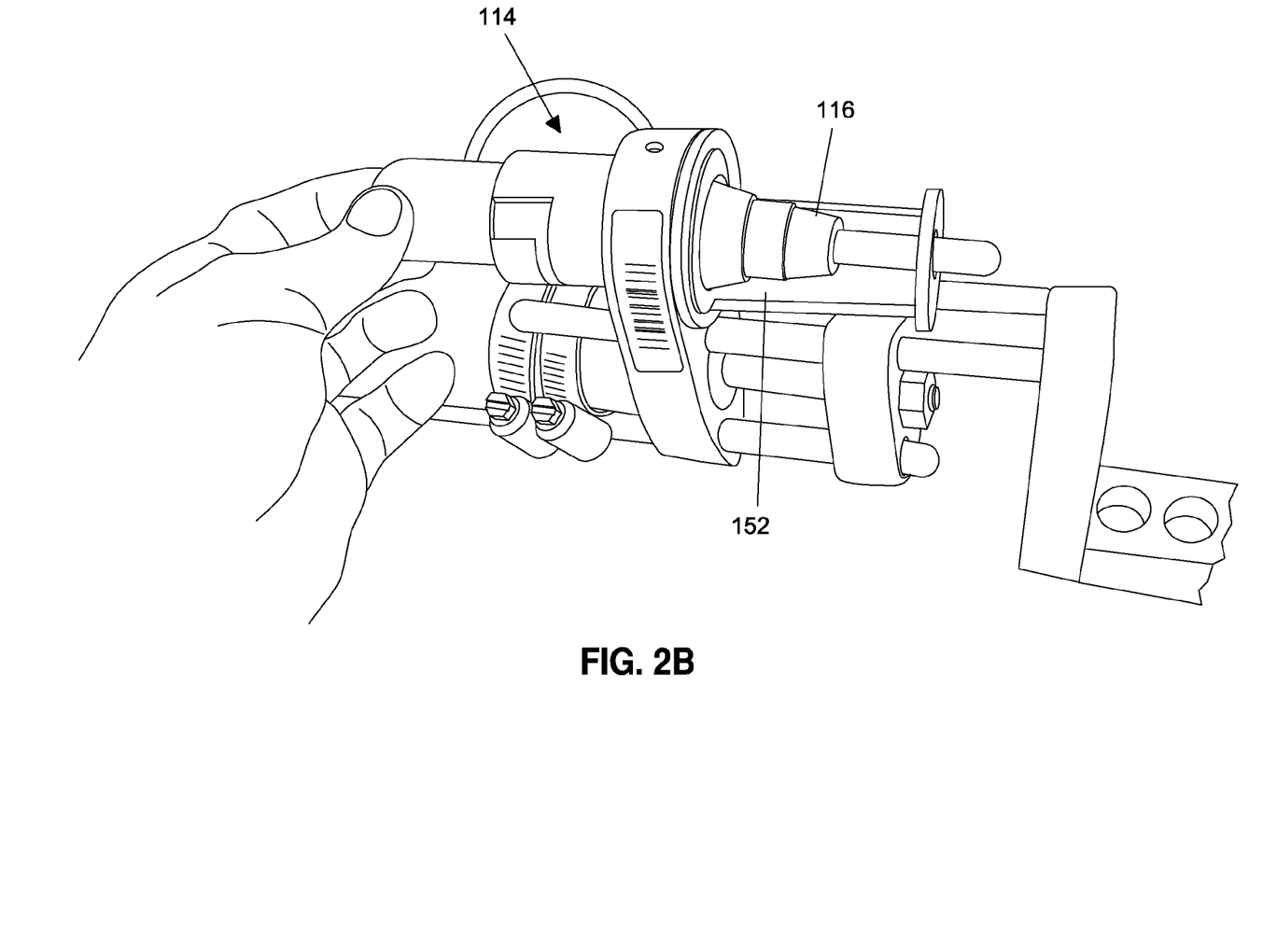
FIG. 2B illustrates a perspective view of a holder with a probe being inserted into a chamber, in accordance with various aspects of the subject technology.

FIG. 2A illustrates a perspective view of holder 114, in accordance with various aspects of the subject technology. Holder 114 comprises holder body 144. For example, holder body 144 may be in the shape of a tube. A first opening 146 is defined at a first end of holder body 144, and a second opening 148 is defined at a second end of holder body 144. Holder 114 also comprises cap 150. In some aspects, chamber 152 is defined in holder body 144 between first opening 146 and second opening 148. Chamber 152 is sized to receive probe 116. For example, FIG. 2B illustrates a perspective view of holder 114 with probe 116 being inserted into chamber 152, in accordance with various aspects of the subject technology.

Figure 2C:
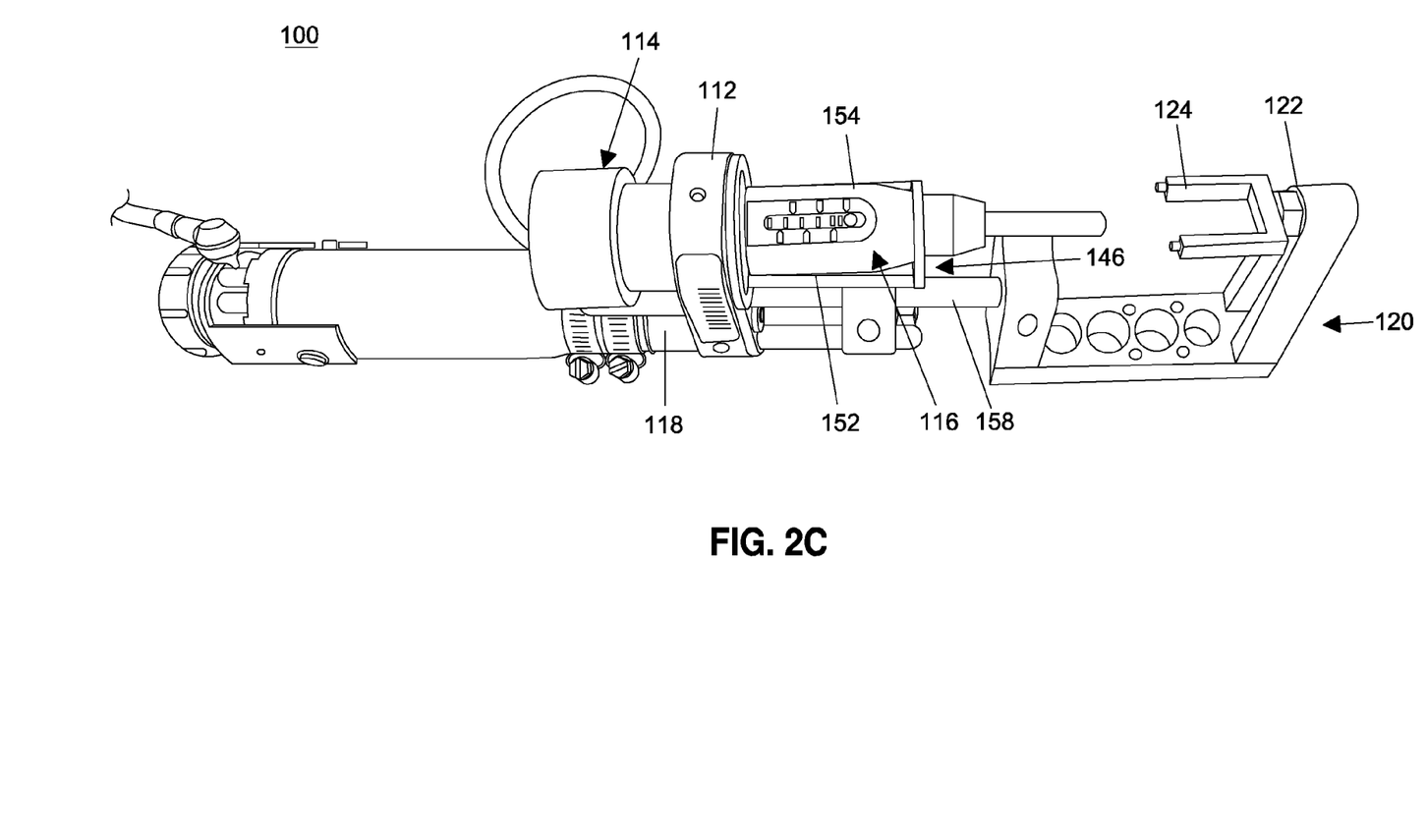
FIG. 2C illustrates a top view of a nutplate tester with a holder securing a probe, in accordance with various aspects of the subject technology.

FIG. 2C illustrates a top view of nutplate tester 100 with holder 114 securing probe 116, in accordance with various aspects of the subject technology. In some aspects, a diameter of first opening 146 is less than a diameter of shaft 154 of probe 116. Furthermore, cap 150 is configured to cover second opening 148. Thus, probe 116 may be secured within chamber 152. When probe 116 is secured within chamber 152, probe 116 extends through first opening 146 toward attachment portion 122 of extension frame 120.

Referring to FIGS. 2A and 2C, window 156 is defined in a wall of holder body 144 such that shaft 154 of probe 116 is visible to an operator of nutplate tester 100. Window 156 may be beneficial if probe 116 is a compression nutplate tester such as the CB602. The CB602 provides on its shaft 154 a reading of the amount of force applied to a particular nutplate. Thus, window 156 allows the operator to view the reading when using the nutplate tester 100 to hold the CB602 to test the nutplate.

Referring to FIG. 2C, attachment portion 122 may be configured to attach to post foot 124. When post foot 124 is attached to attachment portion 122, post foot 124 may engage a structure (not shown) that a particular nutplate is fastened to. Thus, pneumatic actuator 118 may apply pressure against holder 114 relative to extension frame 120 such that probe 116 engages the nutplate fastened to the structure engaged by post foot 124. In some aspects, post foot 124 secures the structure in place so that when probe 116 engages the nutplate, probe 116 applies pressure against the nutplate relative to the structure in order to test the nutplate. Although post foot 124 is shown as a two-post foot, post foot 124 may be a four-post foot or any other suitable post-foots for engaging a particular structure. In some aspects, the structure may be a wall of an aircraft, automobile, boat, or other suitable structure having a nutplate fastened thereto.

According to certain aspects, extension frame 120 is a C-frame, wherein attachment portion 122 is disposed on an end of the C-frame, as shown in FIG. 2C. The C-frame is oriented such that when post foot 124 is attached to attachment portion 122, post foot 124 extends toward probe 116 held by holder 114.

Referring back to FIG. 1, fluid intake assembly 132 is coupled to feed control 130 and/or pneumatic actuator 118. Fluid intake assembly 132 is configured to receive fluid, such as gas or liquid, to supply the fluid to feed control 130 and/or pneumatic actuator 118. In one example, the fluid may be compressed air. In some aspects, fluid intake assembly 132 comprises hose 134 coupled to a fluid source (not shown) for receiving the fluid. Fluid intake assembly 132 also comprises a valve (not shown) attached to hose 134, in addition to trigger 136 that is configured to open the valve upon actuation to allow the fluid to be supplied to feed control 130 and/or pneumatic actuator 118.

According to various aspects of the subject technology, feed control 130 is configured to control fluid to be supplied to pneumatic actuator 118 to apply pressure by pneumatic actuator 118 against holder 114 relative to extension frame 120 according to at least one of a controlled speed and a controlled pressure. Thus, an operator of nutplate tester 100 may adjust the speed at which probe 116 moves toward a nutplate being tested and/or control the pressure that probe 116 applies against the nutplate. Feed control 130 may be an air pressure regulator or other suitable mechanism for controlling the fluid to be supplied to pneumatic actuator 118 in order to adjust the speed and/or pressure at which probe 116 engages a particular nutplate. In some aspects, feed control 130 comprises dial 178 that an operator may adjust to control the speed and/or pressure of the fluid to be supplied to pneumatic actuator 118.

According to various aspects of the subject technology, nutplate tester 100 comprises one or more guide rods 158 that couple main body 112 to extension frame 120. Extension frame 120 may be fastened to one end of the one or more guide rods 158. Main body 112 is configured to slide relative to extension frame 120 along the one or more guide rods 158. In some aspects, holder 114 is mounted on main body 112. Thus, pneumatic actuator 118 may apply pressure against holder 114 by applying pressure against main body 112 relative to extension frame 120. Extension frame 120 may be positioned such that attachment portion 122 is closer to or farther away from holder 114 depending on the size of the structure that a tested nutplate is fastened to.

Figure 3:
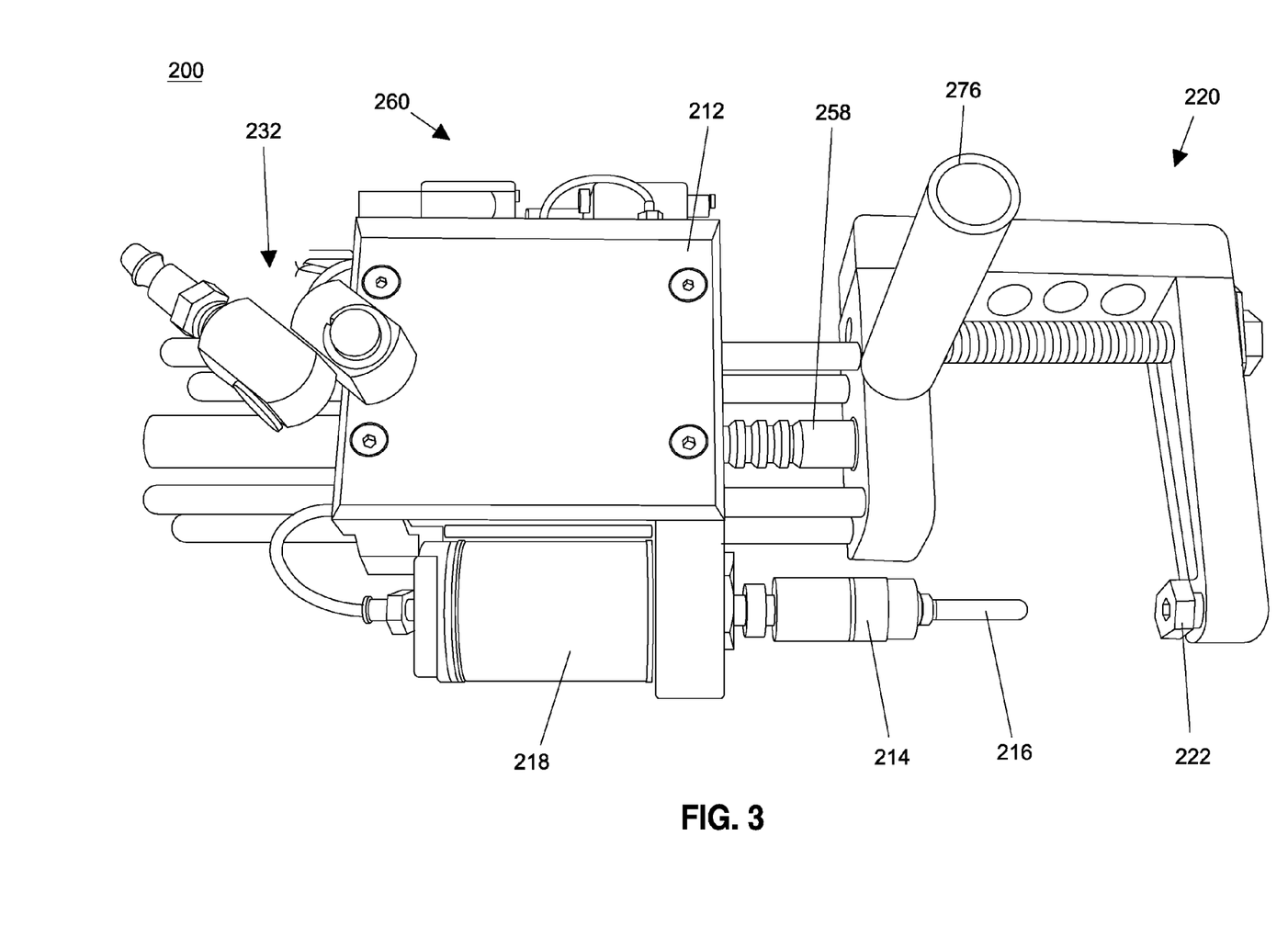
FIG. 3 illustrates a side view of a nutplate tester, in accordance with various aspects of the subject technology.

FIG. 3 illustrates a side view of nutplate tester 200, in accordance with various aspects of the subject technology. Nutplate tester 200 comprises main body 212, holder 214 coupled to main body 212, pneumatic actuator 218 coupled to holder 214, extension frame 220 coupled to main body 212, and fluid intake assembly 232. Holder 214 is configured to hold probe 216, which is used to engage and test a nutplate (not shown) coupled to attachment portion 222 of extension frame 220. Nutplate tester 200 may operate in a similar manner as nutplate tester 100. For example, pneumatic actuator 218 may be an air activated cylinder that applies pressure against holder 214 relative to attachment portion 22 to engage and test the nutplate by probe 216.

In some aspects, probe 216 may be a rod or another elongate member having a suitable shape to engage a nutplate. In some aspects, probe 216 may be made of steel or other suitable material sufficiently strong to engage and test a nutplate. Probe 216 may be interchanged with probes of other suitable diameters depending on the size of the nutplate being tested. In some aspects, holder 214 may be a quick release chuck that is configured to attach to and release probe 216. For example, probe 216 may be released by sliding probe 216 forward (e.g., toward attachment portion 22). Thus, other probes of suitable diameters may be quickly interchanged using the quick release chuck.

According to various aspects of the subject technology, nutplate tester 200 comprises handle 276 mounted on extension frame 220. Handle 276 may provide an operator of nutplate tester 200 more leverage when using nutplate tester 200 to test a particular nutplate. Although handle 276 is shown as mounted on one side of extension frame 220, handle 276 may also be mounted on a different side of extension frame 220 or on main body 212 provided that the operator of nutplate tester 200 is able to properly grip handle 276 for using nutplate tester 200.

Figure 4A:
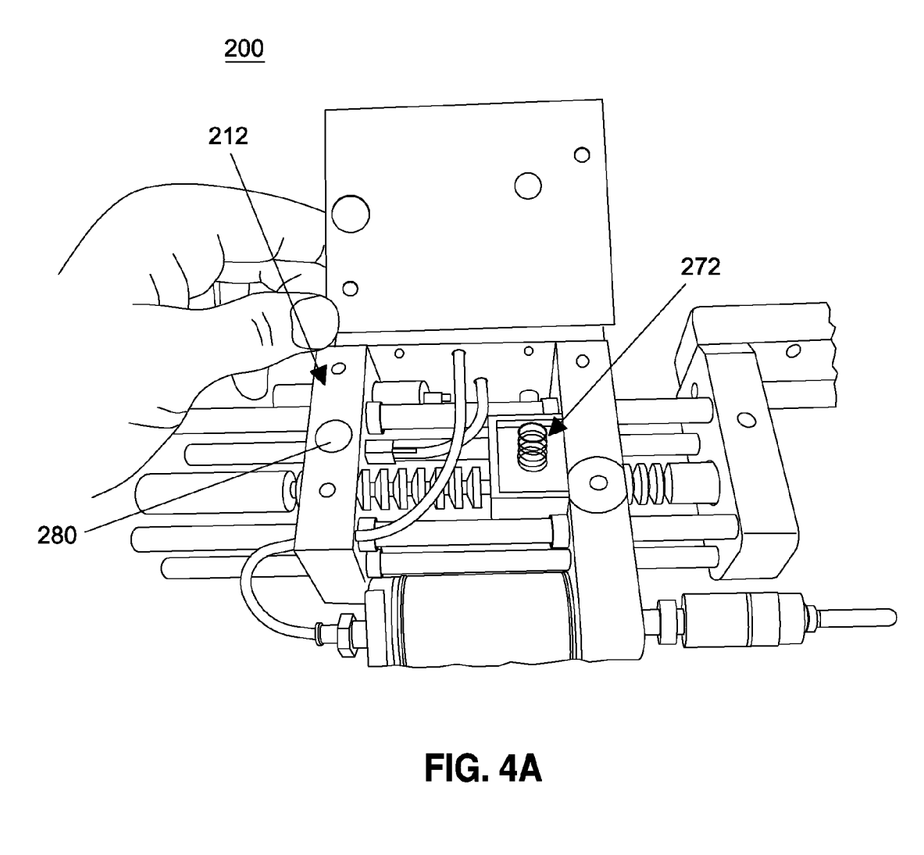
FIGS. 4A and 4B illustrate side views of a nutplate tester with a cover removed from a main body to provide internal views of the main body, in accordance with various aspects of the subject technology.
Figure 4B:
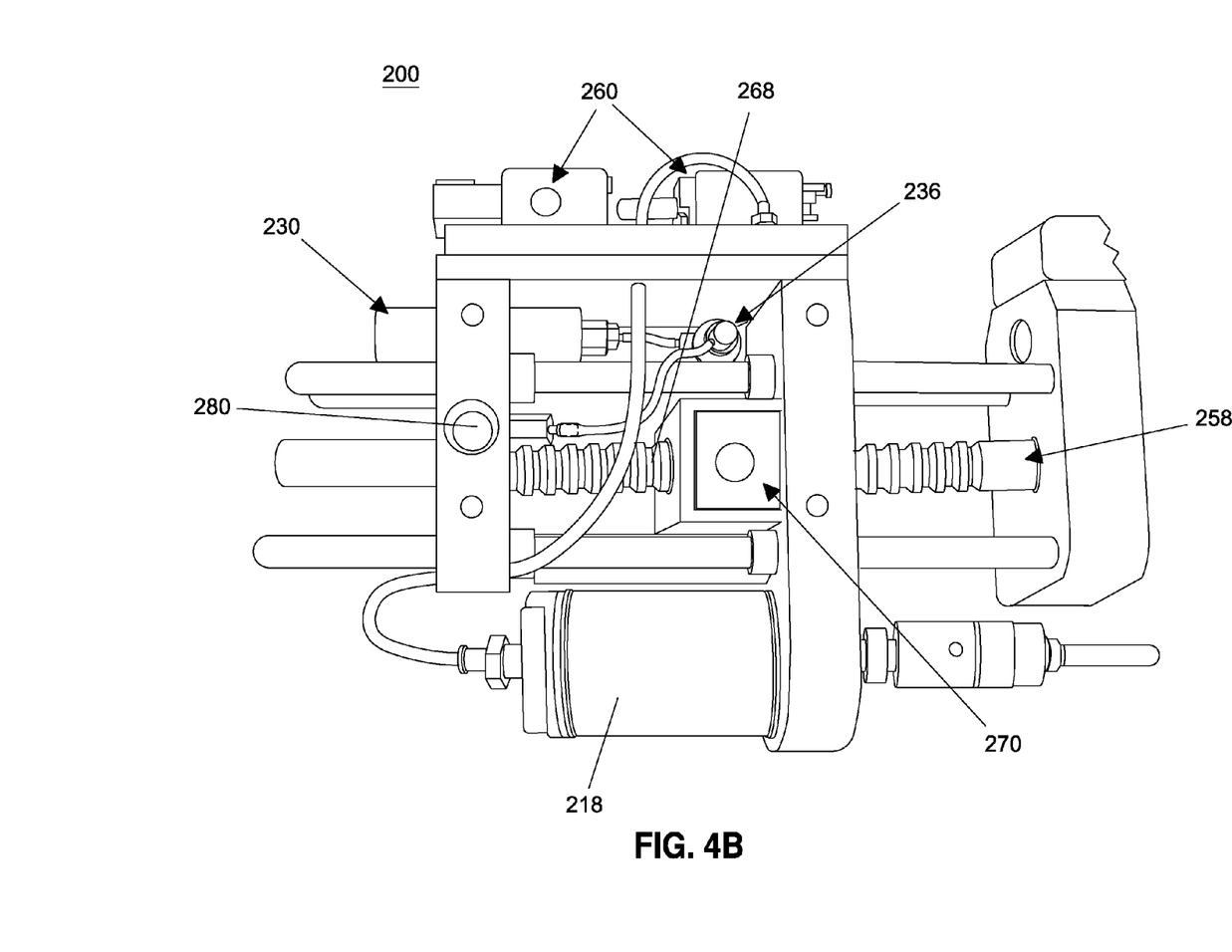

Similar to feed control 130 of nutplate tester 100, nutplate tester 200 also comprises a feed control (not shown in FIG. 3) coupled to pneumatic actuator 218 and is configured to control fluid to be supplied to pneumatic actuator 218 to apply the pressure by pneumatic actuator 218 against holder 214 relative to extension frame 220 according to at least one of a controlled speed and a controlled pressure. Thus, an operator of nutplate tester 200 may adjust the speed at which probe 216 moves toward a nutplate being tested and/or control the pressure that probe 216 applies against the nutplate. Fluid intake assembly 232 may be a swivel air hose connector connected to a fluid source (not shown) and receives the fluid from the fluid source. FIGS. 4A and 4B illustrate side views of nutplate tester 200 with a cover removed from main body 212 to provide internal views of main body 212, in accordance with various aspects of the subject technology. The fluid is supplied into channel 280 from fluid intake assembly 232. Push button actuator 236 may be a button that when pressed, opens a valve for allowing the fluid from channel 280 to proceed into feed control 230 of nutplate tester 200.

According to certain aspects, feed control 230 may be an air pressure regulator or other suitable mechanism for controlling the fluid to be supplied to pneumatic actuator 218 in order to adjust the speed and/or pressure at which probe 216 engages a particular nutplate. In some aspects, feed control 230 comprises a dial that an operator may adjust to control the speed and/or pressure of the fluid to be supplied to pneumatic actuator 218. In some aspects, feed control 230 supplies the fluid received from channel 280 to timer assembly 260 of nutplate tester 200.

In some aspects, timer assembly 260 may be used to control the amount of time that probe 216 applies pressure against a nutplate. For example, timer assembly 260 is coupled to pneumatic actuator 218 and is configured to control fluid to be supplied to pneumatic actuator 218 to apply pressure by pneumatic actuator 218 against holder 214 relative to extension frame 220 for a controlled duration. Thus, probe 216 held by holder 214 may also apply the pressure against the nutplate for the controlled duration. In some aspects, timer assembly 260 may be configured such that the controlled duration is about two to three seconds. However, time assembly 260 may be configured such that the controlled duration is set at other amounts of time depending on the size of the nutplate being tested, the size of probe 216, the manner in which the nutplate is fastened to a particular structure, etc.

In some aspects, timer assembly 260 comprises a regulator valve coupled to feed control 230 and pneumatic actuator 218. The regulator valve is configured to receive the fluid from feed control 230 and supply the fluid to pneumatic actuator 218. Timer assembly 260 may also comprise a solenoid coupled to the regulator valve and is configured to control the regulator valve to supply the fluid to pneumatic actuator 218 by the regulator valve according to the controlled duration. Timer assembly 260 may be other suitable mechanisms for controlling the fluid to be supplied to pneumatic actuator 218 to apply pressure by pneumatic actuator 218 against holder 214 relative to extension frame 220 for the controlled duration.

Figure 5A:
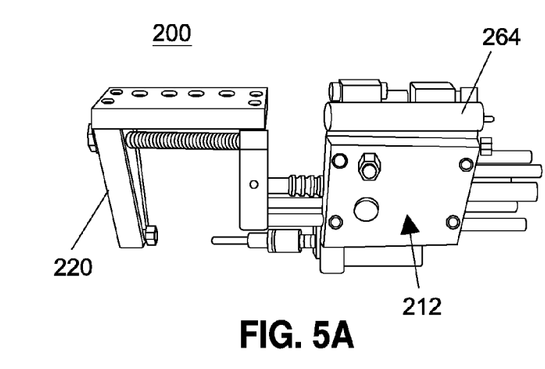
FIGS. 5A and 5B illustrate side views of a nutplate tester opposite the side view shown in FIG. 3, in accordance with various aspects of the subject technology.
Figure 5B:
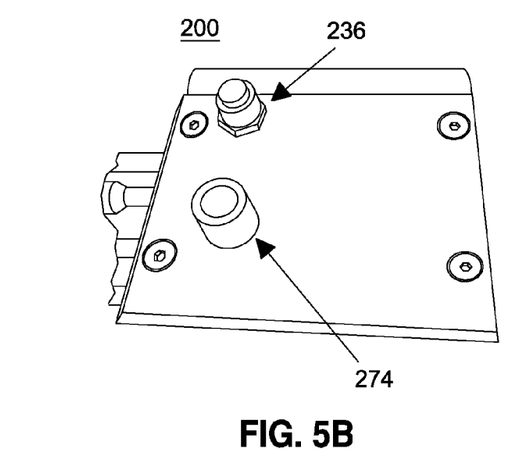
Figure 5C:
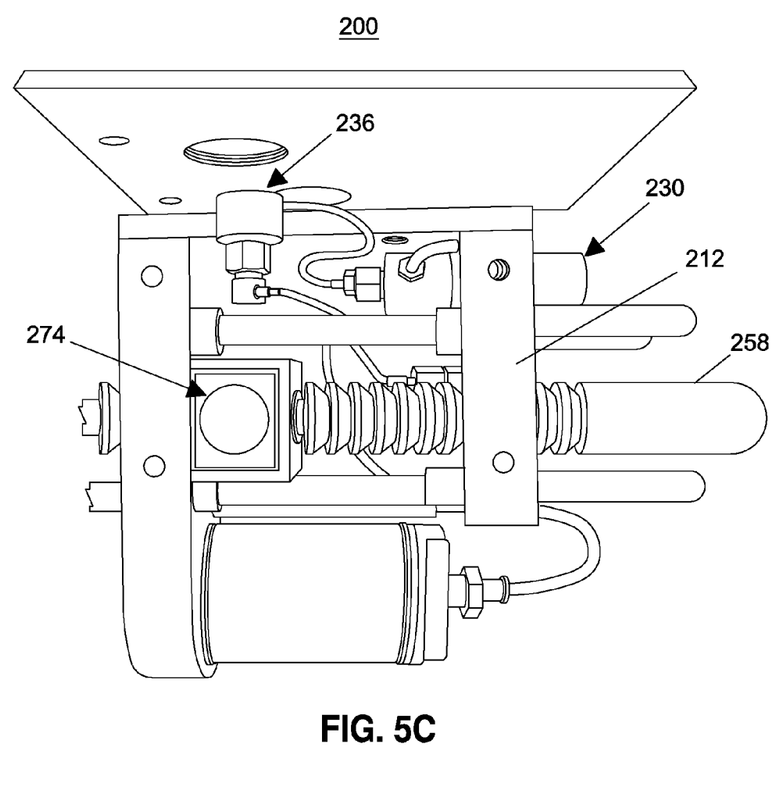
FIG. 5C illustrates a side view of a nutplate tester with a cover removed from a main body to provide an internal view of the main body, in accordance with various aspects of the subject technology.

FIGS. 5A and 5B illustrate side views of nutplate tester 200 opposite the side view shown in FIG. 3, in accordance with various aspects of the subject technology. FIG. 5C illustrates a side view of nutplate tester 200 with a cover removed from main body 212 to provide an internal view of main body 212, in accordance with various aspects of the subject technology. As shown in FIG. 5A, nutplate tester 200 further comprises storage chamber 264 coupled to timer assembly 260. Storage chamber 264 is configured to receive fluid from the regulator valve of timer assembly 260 for fluid that regulator valve receives beyond the controlled duration. Thus, storage chamber 264 is configured to receive any excess fluid that is supplied to nutplate tester 200, but is not used to apply pressure against holder 214.

According to various aspects of the subject technology, nutplate tester 200 also comprises guide rod 258 coupling main body 212 to extension frame 220. In some aspects, extension frame 220 is fastened to an end of guide rod 258. Guide rod 258 may be used to position extension frame 220 relative to main body 212. In some aspects, extension frame 220 may be locked in position relative to main body 212 using guide rod 258. Referring to FIGS. 4A, 4B, and 5C, guide rod 258 comprises at least one groove 268. First locking member 270 is coupled to main body 212 and includes at least one protrusion (not shown) corresponding to the at least one groove 268. For example, first locking member 270 may be a block having the at least one protrusion that corresponds to the at least one groove 268. Second locking member 272 is coupled to main body 212 and is configured to apply a first force against first locking member 270 to engage the at least one groove 268 by the at least one protrusion of first locking member 270 to lock main body 212 to guide rod 258, thereby locking extension frame 220 in a fixed position relative to main body 212. Second locking member 272, for example, may be a spring that exerts a continuous force against first locking member 270 so that the at least one protrusion of first locking member 270 maintains its engagement with the at least one groove 268 of guide rod 258.

According to various aspects of the subject technology, a mechanism is provided for the quick release of guide rod 258 from main body 212. Referring to FIG. 5C, nutplate tester 200 comprises releasing member 274 coupled to first locking member 270 (e.g., as shown in FIG. 4B). Releasing member 274 may be a button, for example. An operator of nutplate tester 200 may press releasing member 274 with a second force greater than the first force that is applied against first locking member 270. As a result, the at least one protrusion of first locking member 270 may disengage from the at least one groove 268 to unlock main body 212 from guide rod 258, thereby allowing extension frame 220 to move relative to main body 212. By locking and unlocking extension frame 220 relative to main body 212, attachment portion 222 may be adjusted to be farther or closer to probe 216.

Figure 6:
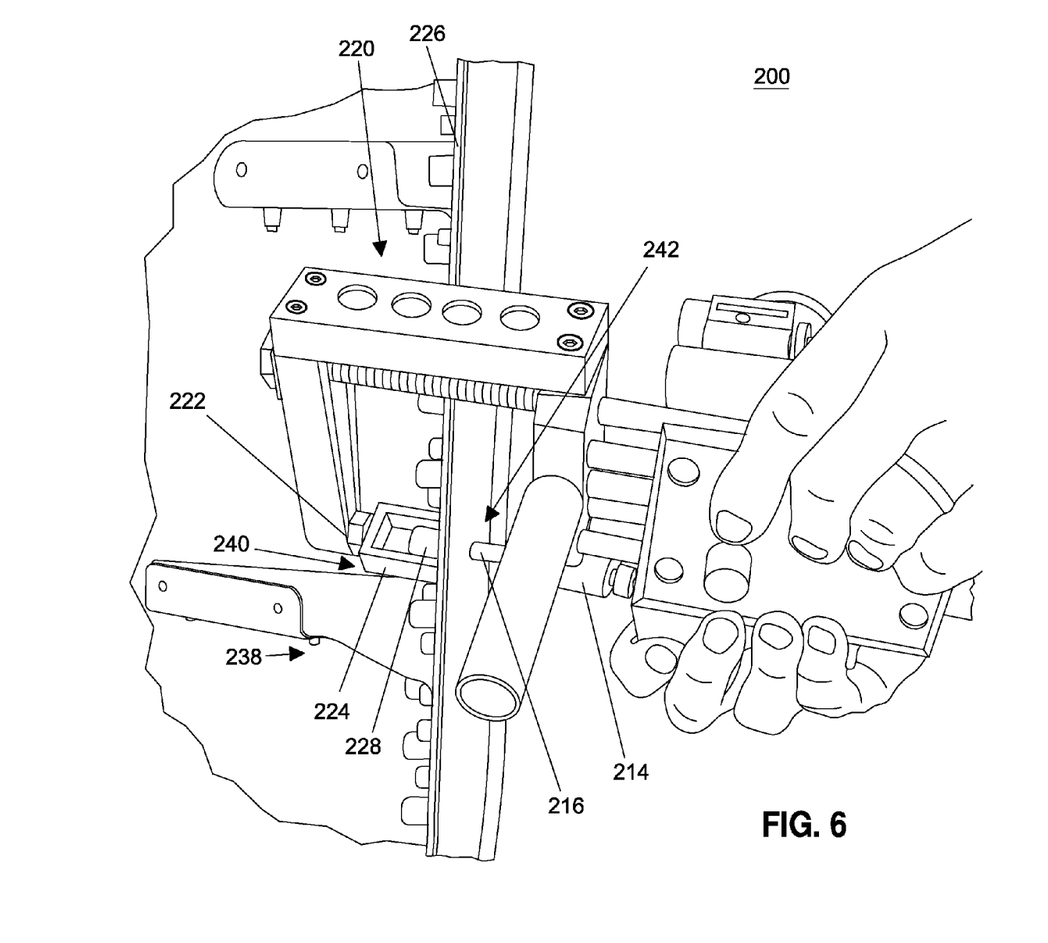
FIG. 6 illustrates an example of a nutplate tester applied to test a nutplate fastened to a structure, in accordance with various aspects of the subject technology.

FIG. 6 illustrates an example of nutplate tester 200 applied to test nutplate 228 fastened to structure 226, in accordance with various aspects of the subject technology. As shown in FIG. 6, extension frame 220 is a C-frame, wherein attachment portion 222 is disposed on an end of the C-frame. Attachment portion 222 is configured to attach to post foot 224. The C-frame is oriented such that when post foot 224 is attached to attachment portion 222, post foot 224 extends toward probe 216 held by holder 214. Thus, post foot 224 may engage side 238 of structure 226 that is on the same side as side 240 of nutplate 228, while probe 216 may engage side 242 of nutplate 228 that is opposite side 240. Pneumatic actuator 218 may apply pressure against holder 214 relative to extension frame 220 to engage nutplate 228 by probe 216. By engaging structure 226, post foot 224 secures structure 226 in place so that when probe 216 engages nutplate 228, probe 216 applies pressure against nutplate 228 relative to structure 226 for testing nutplate 228.

Figure 7:
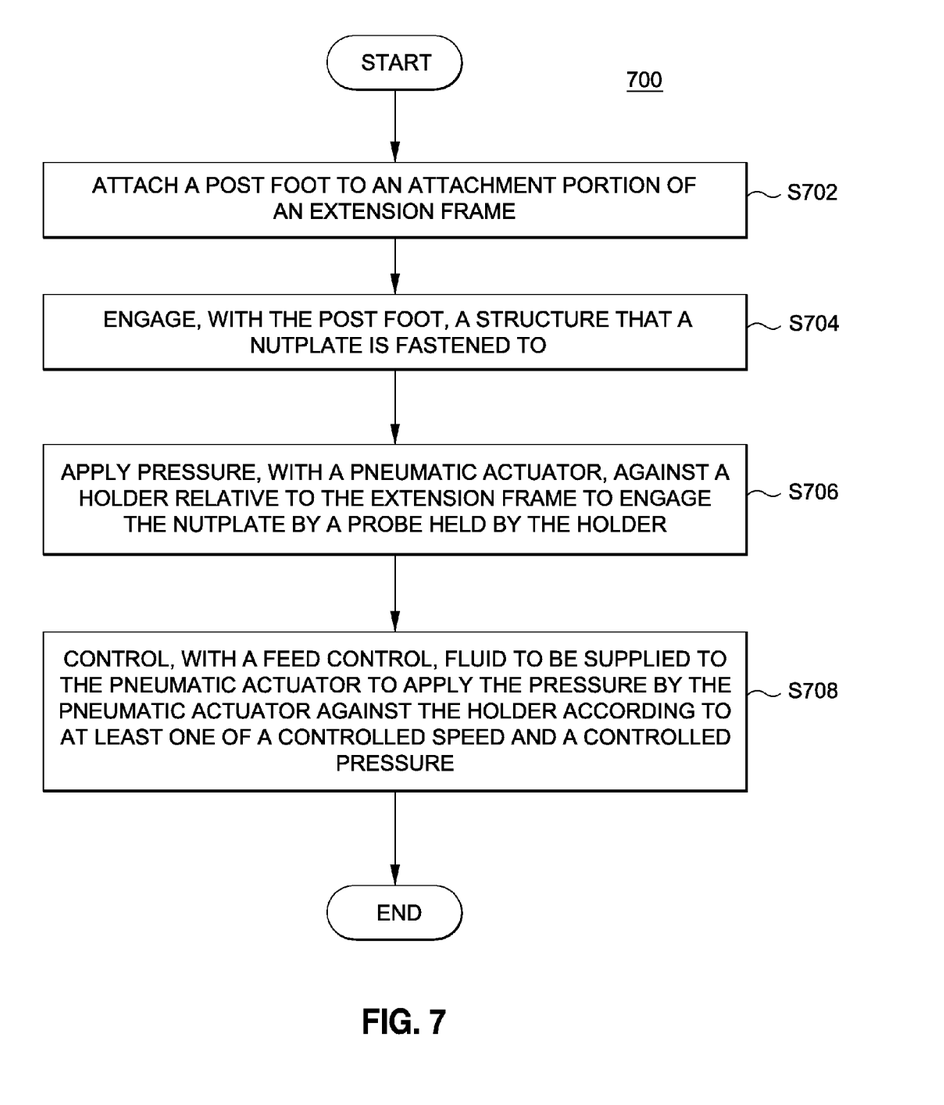
FIG. 7 illustrates an example of a method for testing a nutplate, in accordance with various aspects of the subject technology.

FIG. 7 illustrates an example of method 700 for testing a nutplate, in accordance with various aspects of the subject technology. Method 700 comprises: attaching a post foot to an attachment portion of an extension frame (S702); engaging, with the post foot, a structure that a nutplate is fastened to (S704); applying pressure, with a pneumatic actuator, against a holder relative to the extension frame to engage the nutplate by a probe held by the holder (S706); and controlling, with a feed control, fluid to be supplied to the pneumatic actuator to apply the pressure by the pneumatic actuator against the holder according to at least one of a controlled speed and a controlled pressure (S708).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A nutplate tester comprising:
   a main body;
   a holder coupled to the main body and configured to hold a probe;
   a pneumatic actuator coupled to the holder;
   an extension frame coupled to the main body and having an attachment portion configured to attach to a post foot that engages a structure that a nutplate is fastened to, wherein the pneumatic actuator is configured to apply pressure against the holder relative to the extension frame to engage the nutplate by the probe held by the holder; and
   a feed control coupled to the pneumatic actuator, the feed control configured to control fluid to be supplied to the pneumatic actuator to apply the pressure by the pneumatic actuator against the holder according to at least one of a controlled speed and a controlled pressure.

2. The nutplate tester of claim 1, further comprising a fluid intake assembly coupled to the feed control and configured to receive the fluid and supply the fluid to the feed control.

3. The nutplate tester of claim 2, wherein the fluid intake assembly comprises:
   a hose coupled to a fluid source for receiving the fluid;
   a valve attached to the hose; and
   a trigger configured to open the valve upon actuation to allow the fluid to be supplied to the feed control.

4. The nutplate tester of claim 1, further comprising the post foot, the post foot configured to engage the structure to apply the pressure by the probe held by the holder against the nutplate relative to the structure.

5. The nutplate tester of claim 1, wherein the extension frame is a C-frame, wherein the attachment portion is disposed on an end of the C-frame, wherein the C-frame is oriented such that when the post foot is attached to the attachment portion, the post foot extends toward the probe held by the holder.

6. The nutplate tester of claim 5, further comprising the post foot, the post foot configured to engage a first side of the structure, the first side of the structure being aligned with a first side of the nutplate, the pneumatic actuator configured to apply the pressure against the holder to engage a second side of the nutplate by the probe held by the holder, the second side of the nutplate being opposite the first side of the nutplate.

7. The nutplate tester of claim 1, wherein the holder comprises:
   a holder body;
   a first opening defined at a first end of the holder body;
   a second opening defined at a second end of the holder body;
   a cap; and
   a chamber defined in the holder body between the first opening and the second opening, the chamber sized to receive the probe,
   wherein the probe extends through the first opening toward the attachment portion of the extension frame,
   wherein a diameter of the first opening is less than a diameter of a shaft of the probe, and
   wherein the cap is configured to cover the second opening to secure the probe within the chamber.

8. The nutplate tester of claim 7, wherein the probe comprises a compression nutplate tester.

9. The nutplate tester of claim 7, wherein a window is defined in a wall of the holder body such that the shaft of the probe is visible to an operator of the nutplate tester.

10. The nutplate tester of claim 1, wherein the holder is mounted on the main body, and wherein the pneumatic actuator is configured to apply the pressure against the main body relative to the extension frame.

11. The nutplate tester of claim 10, further comprising a guide rod coupling the main body to the extension frame, wherein the main body is configured to slide relative to the extension frame along the guide rod.

12. The nutplate tester of claim 1, further comprising a timer assembly coupled to the pneumatic actuator, the timer assembly configured to control fluid to be supplied to the pneumatic actuator to apply the pressure by the pneumatic actuator against the holder for a controlled duration.

13. The nutplate tester of claim 12, wherein the timer assembly comprises:
   a regulator valve coupled to the feed control and the pneumatic actuator, the regulator valve configured to receive the fluid from the feed control and supply the fluid to the pneumatic actuator; and
   a solenoid coupled to the regulator valve, the solenoid configured to control the regulator valve to supply the fluid to the pneumatic actuator by the regulator valve according to the controlled duration.

14. The nutplate tester of claim 13, further comprising a storage chamber coupled to the regulator valve, the storage chamber configured to receive the fluid from the regulator valve after the controlled duration.

15. The nutplate tester of claim 1, wherein the holder comprises a release chuck configured to attach to the probe and to release the probe.

16. The nutplate tester of claim 1, further comprising:
   a guide rod coupling the main body to the extension frame, the guide rod comprising at least one groove;
   a first locking member coupled to the main body, the first locking member having at least one protrusion corresponding to the at least one groove;
   a second locking member coupled to the main body, the second locking member configured to apply a first force against the first locking member to engage the at least one groove by the at least one protrusion to lock the main body to the guide rod, thereby locking the extension frame in a fixed position relative to the main body; and
   a releasing member coupled to the first locking member, the releasing member configured to apply a second force greater than the first force against the first locking member to disengage from the at least one groove by the at least one protrusion to unlock the main body from the guide rod, thereby allowing the extension frame to move relative to the main body.

17. The nutplate tester of claim 1, further comprising a handle mounted on the main body or the extension frame.

18. The nutplate tester of claim 17, wherein the extension frame is a C-frame, and wherein the handle is mounted on a side of the C-frame.

19. A method of for testing a nutplate, the method comprising:
- attaching a post foot to an attachment portion of an extension frame;
- engaging, with the post foot, a structure that a nutplate is fastened to;
- applying pressure, with a pneumatic actuator, against a holder relative to the extension frame to engage the nutplate by a probe held by the holder; and
- controlling, with a feed control, fluid to be supplied to the pneumatic actuator to apply the pressure by the pneumatic actuator against the holder according to at least one of a controlled speed and a controlled pressure.

20. A nutplate tester comprising:
- a main body;
- a holder coupled to the main body and configured to hold a probe;
- a pneumatic actuator coupled to the holder;
- an extension frame coupled to the main body;
- a post foot attached to an attachment portion of the extension frame, the post foot configured to engage a structure that a nutplate is fastened to, wherein the pneumatic actuator is configured to apply pressure against the holder relative to the extension frame to engage the nutplate by the probe held by the holder;
- a feed control coupled to the pneumatic actuator, the feed control configured to control fluid to be supplied to the pneumatic actuator to apply the pressure by the pneumatic actuator against the holder according to at least one of a controlled speed and a controlled pressure; and
- a timer assembly coupled to the pneumatic actuator, the timer assembly configured to control fluid to be supplied to the pneumatic actuator to apply the pressure by the pneumatic actuator against the holder for a controlled duration.

\* \* \* \* \*